Patented July 31, 1951

2,562,776

UNITED STATES PATENT OFFICE 2,562,776

LUBRICANT ADDITIVE

Elmer B. Cyphers, Cranford, and Jeffrey H. Bartlett, Westfield, N. J., assignors to Standard Oil Development Company, a corporation of Delaware No Drawing. Application June 24, 1948,
Serial No. 35,054

5 Claims. (Cl. 252—32.7)

1

The present invention relates to an improvement in lubricant additives and more particularly to an additive which has the combined properties of improving the viscosity index, depressing the pour point, and imparting extreme pressure characteristics to lubricating oils and the like.

For many purposes it is highly desirable to employ a lubricant which has greater load carrying properties than ordinary mineral base lubricating oils. It is also frequently desirable, in the use of mineral lubricating oils, to add to such oils a material which will keep them fluid at low temperatures and will also increase their viscosity at higher temperatures. A uniform or substantially uniform viscosity over a wide range of temperatures is very desirable where operating temperatures vary considerably and particularly where unit loads borne by mechanical elements are high.

In the prior art it has commonly been considered necessary to add several materials to lubricating oils to accomplish the various purposes referred to above. Thus, where it has been desirable to increase the unit load carrying capacity of a lubricant various extreme pressure agents have been incorporated in lubricants. These have usually included a composition capable of releasing free or active phosphorous, sulfur, or chlorine, which, when the ordinary lubricating film fails, will immediately react with the metal to form a protective metal sulfide, phosphide, chloride, or the like, on the surface of the metal.

Where it has been found desirable to lower the pour point of a mineral oil lubricant, this has been accomplished in the past, as a general rule, by addition to the oil of a material which tends to improve fluidity at low temperatures, such as a high molecular weight condensation product of chlorwax and naphthalene. For improving the viscosity index still another composition, such as a viscous polymer of isobutylene, rubber or rubber like material has been added.

The present invention has for its object the production and use of a single composition which may be added to mineral base lubricants and the like to impart all of the desirable characteristics mentioned above. Thus the material with which this invention deals has extreme pressure properties, tends to lower the pour point, and improves the viscosity index of mineral oils because it incorporates all the various chemical elements and properties which produce these separate results.

The preferred material for accomplishing the results outlined above is a high molecular weight condensation product which is prepared by combining halogenated esters or halogenated polyesters with a suitable metal salt of an alkylated phosphorus-sulfur compound. Such a material

2 may be prepared, for example, by reacting a metal salt of a dialkylated thiophosphoric acid, or of a dialkylated thiophosphorous acid, or a mixture thereof, with halogenated esters, halogenated polyesters, or halogenated copolymers of two or more esters, or halogenated copolymers of one or more esters with other unsaturated compounds, such as styrene, isobutylene and the like. The types of esters and polymers etc., which may be employed for condensation with the metal salts are set forth more fully hereinafter. The invention will be more fully described by references to certain specific compositions and methods of preparation.

EXAMPLE I

A halogenated ester material was produced by charging into a three liter three necked flask the following materials:

348 g. mono-chlormaleic anhydride
1037.5 g. commercial mixture of $C_{10}$ to $C_{18}$ aliphatic alcohols, known as "Lorol B," predominating in lauryl alcohol
1.5 g. sulfosalicylic acid
300 cc. 54 naphtha The flask was equipped with a thermometer, a reflux condenser and a water trap. The material was heated and refluxed for 14 hours at a temperature of 250° to 275° F. During this refluxing a total of 50 cc. of water was collected. The resulting mixture was diluted with 500 cc. of benzol and then given three washes with a 5% aqueous solution of sodium carbonate, followed by three water washes. Thereafter the solvents were removed by evaporation on a steam bath and the resulting product was an ester having the following inspections:

Saponification number=333.7
Neutralization number=3.19
Percent chlorine=6.54
Saybolt viscosity at 210° F.=48.5

The ester produced above, which may be referred to as an alkyl chlormaleate wherein the alkyl radical was a mixture of $C_{10}$ to $C_{18}$ straight chain radicals, was next copolymerized with vinyl acetate.

A one liter four necked flask, equipped with a thermometer, a stirrer, and a condenser, was next charged with 540 grams of the alkyl chlormaleate produced by the process described above. After the ester was heated to 70° C. the air was displaced with nitrogen and 6.0 grams of benzoyl peroxide were added. The mixture was then blown again with nitrogen to remove any traces of air and 60 grams of vinyl acetate were added through the condenser. The mixture was then allowed to polymerize for 16 hours at 70° C. The resulting copolymer was of a very viscous consistency and on analysis was found to have a chlorine content of 5.94% by weight.

The copolymer produced as described above was next condensed with a thiophosphate of sodium as will next be described.

To 830 grams of the commercial mixture of aliphatic alcohols mentioned above and commonly known as "Lorol B," there were added 222 grams of phosphorus pentasulfide ($P_2S_5$) with stirring at room temperature. After thorough mixing, the temperature was raised slowly to 210° F. and was held at that point for 3½ hours. Thereafter the product was cooled and filtered. During this operation a reaction occurred which appears to be substantially as follows:

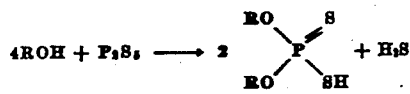

where R is the mixed aliphatic alcohol radical.

The sodium salt of the above described dialkyl dithiophosphoric acid was prepared by neutralization with sodium hydroxide. 7.7 grams of sodium hydroxide were dissolved in 320 cc. of warm absolute ethyl alcohol and this mixture was poured slowly into 106 grams of thiophosphoric acid compound obtained in the foregoing reaction. The mixture was stirred constantly during the addition of the sodium hydroxide. The resulting solution contained the sodium salt of dialkyl dithiophosphoric acid and this was filtered for use in the condensation reaction which followed.

It will be understood that in lieu of sodium hydroxide other metal hydroxides, oxides or alkoxides could be used to prepare the corresponding metallic salt of the alkylated thiophosphate or thiophosphite. For example, potassium or lithium hydroxide or sodium methoxide, ethoxide, etc., could be used if desired.

The condensation reaction between the polyester compound described above and the metal salt of the thiophosphoric acid, was carried out by first heating the copolymer and the alcoholic solution of the metal salt. 250 grams of the copolymer of alkylated chlormaleate and vinyl acetate were heated to a temperature of approximately 150° F. To this was added the entire amount of the ethyl alcohol solution of the sodium salt of thiophosphoric acid described above. The salt of a thiophosphorous acid could be added in a similar manner if desired. The solution was added gradually over a period of 15 to 20 minutes. Thereafter the mixture was heated to refluxing temperature (178° F.) and was refluxed continuously for a period of 5 hours. At the end of the refluxing period the mixture was allowed to cool and settle and it separated into two layers.

The two layers were separated by drawing off the upper layer which contained most of the alcohol. Thereafter both layers were treated to remove the volatile solvent by evaporation with the aid of added benzol and nitrogen. The materials obtained from the respective layers and their sulfur, phosphorus, and chlorine contents respectively are indicated in the following data:

|  | Extract (top layer) | Raffinate (bottom layer) |
|---|---|---|
| Yield, grams | 97 | 231.5 |
| Sulfur, Per Cent | 7.18 | 1.65 |
| Phosphorus, Per Cent | 3.98 | 0.82 |
| Chlorine, Per Cent | 0.65 | 4.47 |

EXAMPLE II

A second sample of a copolymer of "Lorol B" chlormaleate and vinyl acetate was prepared as described in Example I, and reacted with sodium di(Lorol B) dithiophosphate as follows: 102 grams of di(Lorol B) dithiophosphoric acid and 242 grams of absolute ethyl alcohol (solvent) were stirred in a 3-necked flask equipped with a reflux condenser. 12.4 grams of sodium methoxide were added in small increments, and after this addition was completed the mixture was heated to reflux and then cooled to 120° F. 242 grams of the Lorol B chlormaleate-vinyl acetate copolymer previously described were then added and the mixture stirred and heated to reflux, continuing refluxing for three hours. The product was then cooled and filtered and the solvent removed by vacuum stripping.

The product was found to contain the following active elements:

| | Per cent |
|---|---|
| Phosphorus | 1.77 |
| Sulfur | 1.98 |
| Chlorine | 3.94 |

The respective materials taken from the extract and raffinate respectively of Example I and the whole product of Example II were added in small quantities to mineral lubricating oils to determine their effectiveness in improving viscosity index, depressing the pour point, and imparting extreme pressure properties. The results are shown in the following table:

Table

POUR DEPRESSANT PROPERTIES

| Mineral Oil | Additive | Pour Point, °F. | |
|---|---|---|---|
| | | Example I | Example II |
| A | None | +30 | +30 |
| A | 0.2% Raffinate | −25 | |
| A | 0.2% Extract | +20 | |
| A | 0.2% Whole Product | | −15 |
| B | None | +20 | |
| B | 0.2% Raffinate | −30 | |
| B | 0.2% Extract | 0 | |
| B | 0.2% Whole Product | | −25 |
| C | None | +5 | |
| C | 0.2% Whole Product | | −30 |

VISCOSITY INDEX IMPROVING PROPERTIES

| Mineral Oil | Additive | Viscosity Index |
|---|---|---|
| D | None | 97.3 |
| D | 10% Raffinate (Example I) | 114.6 |

EXTREME PRESSURE PROPERTIES

| | Mineral Oil D | | |
|---|---|---|---|
| | Alone | +10% Raffinate (Example I) | +10% Whole Product (Example II) |
| Timken Machine Test | | | |
| Load, lbs | 10 | 51 | 33 |
| Scar Width in ¼₆" | 1.65 | 1.65 | 1.8 |
| Lbs./sq. in | 7,350 | 39,500 | 23,500 |

DESCRIPTION OF MINERAL OIL STOCKS

A. Mid-Continent neutral containing 3½% bright stock, the whole being of S. A. E. 10 grade.
B. Mid-Continent extracted S. A. E. 10 blend.
C. Pennsylvania neutral oil of 180 SUS at 100° F.
D. 45% steam refined Pennsylvania cylinder stock. 55% Mid-Continent acid refined lubricating stock of 50 SUS vis./210.

From the foregoing data it appears that the condensation product, particularly the raffinate, but also the extract, or the unextracted product combines in very good measure the properties of a pour depressant, a viscosity index improving agent, and an extreme pressure agent in a single additive. The material is considered superior to compositions previously known and it appears to have unusual merit. The alkyl radicals of the dialkylated thiophosphorus compound may vary considerably from 6 to 22 carbon atoms for example, 8 to 18 being preferred. Single aliphatic alcohols may be used for alkylating the phosphorus-sulfur composition, such as lauryl alcohol, and any of the aliphatic alcohols having 6 to 18 carbon atoms may be used singly or in combination. An average chain length in the alcohol groups in the $C_{10}$ to $C_{14}$ range is especially preferred when pour point depression is the primary objective.

The halogenated esters from which the final condensation products are formed may include the following classes of compounds:

A. Polymers and copolymers of esters of halogenated $\alpha$-$\beta$ unsaturated carboxylic acids; for example, esters of chlorocrotonic acid, chloromaleic acid, dichloromaleic acid, chlorofumaric acid, chloroacrylic acid, chloromethacrylic acid, chlorocitraconic acid, chloromesaconic acid, chloroitaconic acid, and the like, as well as the corresponding bromo- and iodo-derivatives.

B. Polymers and copolymers of esters of $\alpha$-$\beta$ unsaturated acids and halogenated alcohols, for example, esters of the chlorohydrins, bromohydrins, etc., with crotonic, maleic, fumaric, acrylic, methacrylic citraconic, mesaconic, and itaconic acids, and the like.

C. Polymers and copolymers of vinyl and allyl esters of chloroacids, for example, vinyl chloracetate, allyl chlorostearate and similar esters.

D. Polymers and copolymers of halogenated allyl- or substituted allyl-esters of carboxylic acids, such as beta-chlorallyl esters, chlorocrotyl esters, etc.

E. Copolymers of vinyl chloride with unsaturated esters, preferably aliphatic, such as vinyl palmitate, vinyl stearate and the like.

F. High molecular weight monomeric esters derived from halogenated hydroxy compounds having 3 to 6 carbon atoms, for example, glyceryl monochlorhydrin, glyceryl dichlorhydrin, monochlor trihydroxy butane, dichlor dihydroxy butane, trichlor monohydroxy butane, 1,2-dichlor-3-alkoxy-4-hydroxy butane, halogenated derivatives of higher hydroxylated compounds such as sorbitol, mannitol, polyvinyl alcohol, etc.

G. Monomeric and polymeric esters which have been halogenated, for example, cocoanut oil, lard oil, blown rapeseed oil, fumarate polymers, acrylate polymers, etc.

The invention, as described above, thus comprises several important but related aspects. When 0.02 to 20% of the condensation product is added to an oil, the oil, either mineral base or synthetic (preferably the former for reasons of economy) may be used directly or may be marketed or otherwise used as a concentrate of the additive, to be further diluted as desired. The proportions also depend on the purpose, as pointed out below.

The additive itself also may be marketed for use in lubricating oils, cutting oils, extreme pressure compounds, greases, hydraulic oils and the like. The additive, in general terms, is seen to consist essentially of a condensation product of metal alkyl thiophosphorus salt (e. g. metal alkyl thiophosphate or phosphite), with an organic, halogen-containing material, preferably aliphatic, selected from the following (1) polymers or copolymers of unsaturated monomeric esters wherein either the unsaturation or the halogen is in either the acid or the alcohol group (types A, B, C and D, listed above), (2) copolymers of vinyl halide, especially vinyl chloride, with unsaturated esters (as in type E above), (3) high molecular weight monomeric esters of halogen-containing hydroxy compounds, such as glyceryl monochlorohydrin, etc. (type F above), and (4) halogenated esters such as cocoanut oil, fumarate ester polymers, etc. (type G above).

The invention comprises also certain process aspects, e. g., in one embodiment it involves esterifying a halogen-containing unsaturated acidic material, for example, chlormaleic acid or anhydride, with a suitable alcohol, such as aliphatic alcohol, preferably saturated, having 10 to 18 carbon atoms. An elevated temperature such as 200 to 300° F. is preferably employed, it being desirable to remove water of esterification.

The acidic material or the alcohol must contain a halogen and one of them must contain an unsaturated linkage. The ester thus produced is next copolymerized with a suitable vinyl compound such as vinyl acetate. This is carried out at a temperature in the range from 70° F. to 300° F., preferably from 140° F. to 210° F. An inert solvent such as naphtha or light lubricating oil may be employed in order to control molecular weight within desired limits. Such limits are preferably about 1000 to 25,000, especially 5000 to 15,000, but may be beyond either limit. A peroxide catalyst may be employed, e. g., benzoyl peroxide, and a promoter may be employed to activate the catalyst, if desired.

The copolymer, produced as above, is finally condensed with the metal alkyl thiophosphorus salt, such as sodium dialkyl dithiophosphate. Preferably, the latter reaction is carried out between the temperature limits of about 100° and 200° F.

The quantity of additive which should be employed in a lubricating oil will depend largely upon the use to be made thereof. As will be noted from the table, a very small amount shows an important effect upon the pour point of the oil. For this purpose as little as .02% by weight of the product, preferably the raffinate, may be used, although normally the quantity will be from 0.1 to 1% or 2% by weight. On the other hand, for improving the viscosity index or for carrying heavy loads as an extreme pressure lubricant, the quantity employed is preferably considerably more, for example, 2 to 20% of the total lubricant. A quantity of the order of 5 to 15% is preferred; for example, 10% being recommended for normal extreme pressure use.

The base stock into which these additives are incorporated may be petroleum or synthetic hydrocarbon oils of the lubricating oil viscosity range, or lighter oils, such as those of the kerosene, gas oil, etc. range which are especially suitable for use as hydraulic fluids.

It will be understood that the invention contemplates the manufacture and marketing of the additive per se as a composition of matter and also contemplates its manufacture and sale as an ingredient of prepared lubricating compositions. The material may be used in greases, metal working lubricants, etc., as well as in lubricating oils and it will be understood that various conventional additives such as oxidation inhibitors, rust inhibitors, tackiness agents, and the like, may be included as will be obvious to those skilled in the art.

What is claimed is:

1. A lubricating composition consisting essentially of a mineral base lubricating oil containing 0.02 to 20%, by weight, based on the total composition, of the oil soluble condensation product of a $C_6$ to $C_{22}$ dialkylated dithiophosphate salt of alkali metal condensed at a temperature of about 100 to 200° F. with a copolymer of $C_6$ to $C_{22}$ aliphatic chlormaleate with vinyl acetate, said copolymer being produced at a temperature within the range of about 70° to 300° F. and having a molecular weight between about 1000 and 25,000.

2. As a new composition, the oil soluble condensation product of a sodium salt of a $C_6$ to $C_{22}$ dialkyl dithiophosphate condensed at a temperature of about 100° to 200° F. with a 1000 to 25,000 molecular weight copolymer of $C_6$ to $C_{22}$ alkyl chlormaleate and vinyl acetate.

3. As a new composition, the oil soluble condensation product of a sodium salt of a $C_{10}$ to $C_{18}$ dialkyl dithiophosphate condensed at a temperature of about 100° to 200° F. with a 1000 to 25,000 molecular weight copolymer of $C_{10}$ to $C_{18}$ alkyl chlormaleate and vinyl acetate.

4. A lubricating composition consisting essentially of a mineral base lubricating oil containing 0.02 to 20%, by weight, based on the total composition, of the oil soluble condensation product of a $C_{10}$ to $C_{18}$ dialkylated dithiophosphate salt of alkali metal condensed at a temperature of about 100° to 200° F. with a 1000 to 25,000 molecular weight copolymer of $C_{10}$ to $C_{18}$ alkyl chlormaleate with vinyl acetate.

5. The process which comprises esterifying monochlormaleic anhydride with aliphatic alcohol having 10 to 18 carbon atoms at a temperature of 200° to 300° F., copolymerizing said ester with vinyl acetate at a temperature of 140° F. to 210° F. in the presence of a peroxide catalyst, and condensing said copolymer with an alkali metal dialkyl dithiophosphate having 6 to 22 carbon atoms in each alkyl group, at a temperature of 100° to 200° F.

ELMER B. CYPHERS.
JEFFREY H. BARTLETT.

REFERENCES CITED

The following references are of record in the file of this patent:

UNITED STATES PATENTS

| Number | Name | Date |
| --- | --- | --- |
| 2,261,047 | Asseff | Oct. 28, 1941 |
| 2,266,514 | Romieux | Dec. 16, 1941 |
| 2,444,948 | Musselman | July 13, 1948 |